United States Patent [19]

Mooney

[11] 4,404,842
[45] Sep. 20, 1983

[54] LEAK DETECTOR FOR INTERMITTENT PRESSURE PIPE LINES

[76] Inventor: Joseph R. Mooney, 7780 Townsend Pl., New Orleans, La. 70126

[21] Appl. No.: 368,538

[22] Filed: Apr. 15, 1982

[51] Int. Cl.³ .................. G01M 3/08; G08B 21/00
[52] U.S. Cl. .................. 73/40.5 R; 340/605
[58] Field of Search .................. 73/40.5 R; 340/605

[56] References Cited

U.S. PATENT DOCUMENTS

| | | | |
|---|---|---|---|
| 3,273,753 | 9/1966 | Johnson et al. | 73/40.5 R |
| 3,935,567 | 1/1976 | Reynolds | 73/40.5 R |
| 4,109,512 | 8/1978 | Ledeen | 73/40.5 R |

*Primary Examiner*—S. Clement Swisher
*Attorney, Agent, or Firm*—James B. Lake, Jr.

[57] ABSTRACT

Two pressure sensitive switches are hydraulically mounted in an intermittent pressure pipe line, and electrically connected in a battery power line, for, respectively, defining a pressure drop below a range of "off" presssure in the intermittent pressure pipe line, and interconnecting timing, alarm and latching circuits in and with the battery power circuit. The pressure sensitive switch at the upper limit of the pressure drop connects the power circuit to the timing circuit to energize it to cycle for a timing period, and, with the timing circuit, connects to the latching circuit for making it conducting during the timing period of the timing circuit. The pressure sensitive switch at the lower limit of the pressure drop connects the power circuit to the alarm circuit to energize it through the latching circuit when conducting, and to continue after the timing period ends and until the alarm circuit is deenergized by manually opening a closed reset switch connected between the pressure drop, lower limit pressure sensitive switch and the alarm circuit. When both pressure sensitive switched are not closed during the timing period, the alarm circuit is not energized, since the amount of the pressure drop is correlated with the length of the timing period to correspond with a loss of "off" pressure in amount due only to the pressure of a leak in the intermittent pressure pipe line.

5 Claims, 3 Drawing Figures

LEAK DETECTOR FOR INTERMITTENT PRESSURE PIPE LINES

BACKGROUND OF THE INVENTION

The invention relates generally to apparatus for detecting leaks of flammable fluids in pressure pipe lines, and more particularly to a self-energized, low voltage leak detector for use in service stations having a pressure pipe line for the intermitent-pressure flow delivery of gasoline from a storage tank.

In the closest prior art, Reynolds, U.S. Pat. No. 3,935,527 teaches a leak detector similar to the invention except that a timing circuit is energized from a local electrical power source by the cut-off pressure in a pressure pipe line. Cut-off pressures are variable between pressure pipe lines to provide a variable range of pressures for relating to the invariable time period of a timing circuit, and produces variable rates of leakage that may not be true.

In the invention, the predetermined pressure range is invariable as well as the predetermined time period, and when related produce true gasoline leakage rates for any pressure pipe line. Also the use of an included battery rather than a local electrical power supply to the pressure pipe line for energizing the leak detector ensures that energizing power supply will be unvaried by any overload of a local power supply.

SUMMARY OF THE INVENTION

It is an object of the invention to provide a pressure pipe line leak detector that establishes an invariable predetermined pressure range for relating to an invariable time period to determine a gasoline leakage rate.

Another object of the invention is to provide a self-energized leak detector for use in any pressure pipe line however pressured.

A further object of the invention is to provide a pressure pipe line leak detector for maximum safe use in pressure pipe lines flowing flammable fluids.

DETAILED DESCRIPTION OF THE PREFERRED EMBODIMENT

Figure 1:
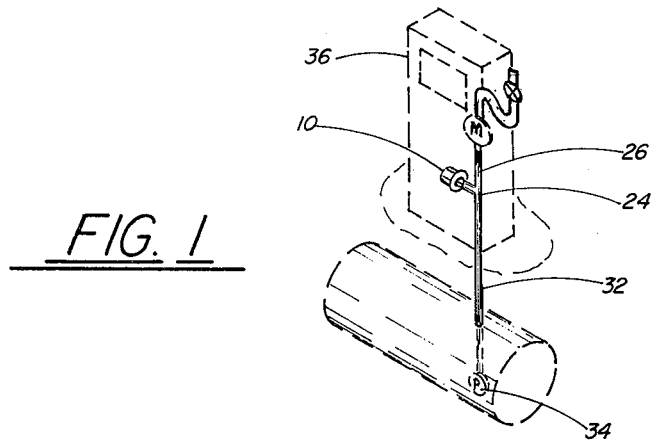
FIG. 1 is a three dimensional view from the upper left of the invention operably installed in a pressure pipe line of a gasoline station.
Figure 2:
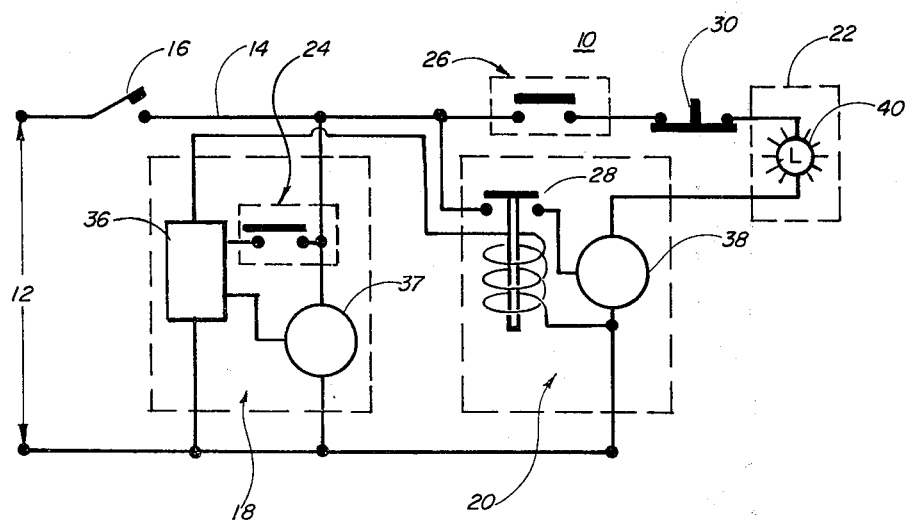
FIG. 2 is a schematic diagram of the invention.

Referring to FIGS. 1 and 2, leak detector 10 comprises a battery 12 for energizing a power circuit 14 through a power switch 16. Power circuit 14 includes a timing circuit 18 for cycling a predetermined time period, a latching circuit 20 energized by means of said timing circuit 18 for the duration of one cycle, and an alarm circuit 22, for indicating leaks, that remains energized through latching circuit 20, and which are all connected in parallel and to each other through two pressure sensitive switches 24 and 26, a relay switch 28, and a reset switch 30 as shown in FIG. 2. Leak detector 10 is shown in FIG. 1 operably mounted by pressure switches 24 and 26 in pressure pipe line 32 and electric pump 34 extending from tank 35 to dispenser 36. No other connections are required. Pump 34 is energized from a local power source to provide a pressure in pressure pipe line 32 of 25–30 p.s.i. (pounds per square inch) for each delivery of gasoline therethrough. After delivery and with pump 34 stopped, pressure falls to about 10 to 20 p.s.i., the setting of a relief valve (not shown) in the pump. If there is a leak in the pressure pipe line pressure in the pipe line will drop faster and to zero p.s.i.

Figure 3:
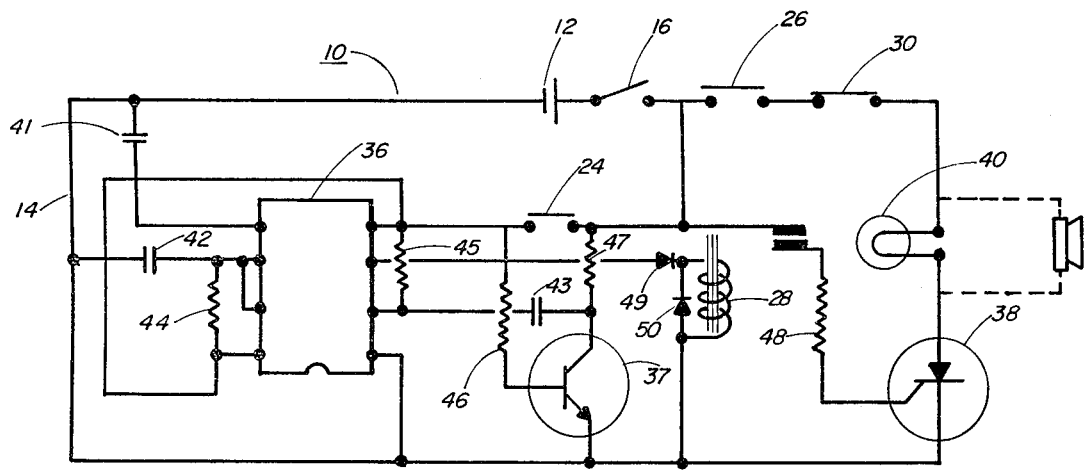
FIG. 3 is a wiring diagram of the invention.

Referring to FIGS. 2 and 3 and the preferred embodiment of the invention, timing circuit 18 comprises pressure sensitive switch 24 set to close at 7 p.s.i. and energize a National LM 555 timer 36 thru a transistor 37 ECG 123 from battery 12 and power switch 16. Timer 36 cycles in 25 sec. to energize latching circuit 20 comprising relay switch 28 to close and connect a silicon controlled rectifier (ECG 5804) 38 to power circuit 14 as shown in wiring diagram of FIG. 3. Alarm circuit 22 comprises a lamp 40 that is connected in power circuit 14 through pressure sensitive switch 26 set to close at 2 p.s.i., the closed reset switch 30, and SCR 38 as shown in the wiring diagram of FIG. 3 and in FIG. 2.

Leak detector 10 in operation with power switch 16 closed, pressure sensitive switch 24 closes when pressure in pressure pipe line 32 drops to 7 p.s.i. to energize timer as explained above for the duration of one cycle. If pipe line 12 pressure drops to 2 p.s.i. before timer 36 completes cycling lamp 40 is energized through SCR 38 which continues to conduct when relay switch opens at the end of the timing cycle for the lamp to continue to light until reset switch 30 is manually opened. If the pressure in pressure pipe line 32 does not drop to 2 p.s.i. by the end of the timing cycle, no recognizable leak exists and lamp 40 is not energized.

Additional materials used but not described in the wiring diagram of FIG. 1 of the preferred embodiment comprises capacitors 41 and 42 of 0.01 farads 50 volts, and capacitor 43 of 10 MF 50 volts; resistances 44 of 2.2 MegO, 45 of 10K O, 46 of 3.3K O, 47 nd 48 of 10K O, and all of $\frac{1}{2}$ volt; and diodes 48 and 50 both IN 4001. Battery 12 is 12 volts. All materials are obtainable at any electronic supply store such as Radio Shack, a division of the Tandy Corporation of Dallas, Tex.

Operation of the detector is predicated on the fact that where a system has no leaks there remains a minimum "off" pressure in the line after pumping has stopped. This "off" pressure is known, but is not a definite value for all pressure line systems. Knowing or determining this pressure allows the design of the leak detector circuit and its function as follows.

With power switch 16 and reset switch 30 closed but with pressure sensitive switches 24 and 26 open because line pressure exceeds 7 p.s.i., the power circuit is not complete and no action takes place. This is the condition where no leak exists.

If a leak occurs, pressure sensitive switch 24 will close below 7 p.s.i. thus powering the timing circuit 18. As noted above this circuit is set to time for approximately 25 seconds. During the timing cycle, voltage is applied to relay switch 28 from said timing circuit to close switch 28. This puts voltage on the gate of silicon controlled rectifier 38.

If the line pressure then drops to 2 p.s.i., the set level of pressure sesitive switch 26, during the time contacts of reset switch 28 are closed, voltage will be put on the anode of silicon controlled rectifier 38 through lamp 40 or an optional buzzer (not shown). SCR 38 will conduct hard and light lamp 40 to full brilliance or sound the optional buzzer. Due to the latching action of SCR 38, the alarm will remain on until silence by opening reset switch 30 manually.

What is claimed is:

1. A leak detector for intermittent pressure pipe lines comprising:
    (a) battery means for energizing a low voltage power circuit;
    (b) manually operable off-on switch means for energizing a low voltage power circuit;
    (c) a pair of pressure sensitive switch means mounted in said intermittent pressure pipe line and connected in said power circuit to close at the upper and lower limits of a predetermined pressure drop in the lower third of said intermittent pressure pipe line's pressure range;
    (d) timing circuit means connected across said power circuit and adapted to be energized by the closing of one of said pair of pressure sensitive switch means at said upper limit of said pressure drop for a predetermined time period;
    (e) latching circuit means connected to said timing circuit means and across said power circuit for being energized during said predetermined time period to conduct; and
    (f) alarm circuit means connected in parallel with said timing circuit means and to said power circuit and latching circuit means for being energized, through said latching circuit means when conducting, by the closing of the other of said pressure sensitive switch means at the lower limit of said predetermined pressure drop for indicating a leak when both pressure sensitive switch means are actuated to close during said predetermined time period of said timing circuit means.

2. A leak detector as described in claim 1 wherein said one pressure sensitive switch means at the upper limit of said predetermined pressure drop is set to close at 7 p.s.i. and said other pressure sensitive switch means at the lower limit of said predetermined pressure drop is set for 2 p.s.i. for said intermittent pressure pipe line having intermittent pressures varying from 30 to 0 p.s.i.

3. A leak detector as described in claim 1 wherein said timing circuit means comprise:
    (a) an integrated solid state timer set to time at 25 seconds; and
    (b) a transistor switch connected across said one pressure sensitive switch means and to said power circuit for energizing said timer at the closing of said one pressure sensitive switch means.

4. A leak detector as described in claim 1 wherein said latching circuit means comprise:
    (a) a relay switch energized to close only during said predetermined time period of said timing circuit means; and
    (b) a silicon controlled rectifier is connected to said relay switch and adapted after initial energizing thereby to conduct.

5. A leak detector as described in claim 1 wherein said warning circuit means comprise:
    (a) lamp means connected between said other pressure sensitive switch means at the lower limit of said predetermined pressure drop and said silicon controlled rectifier of said latching circuit means for energizing both when both said pressure sensitive switch means close and remain energized or latched when said predetermined time period ends: and
    (b) a closed reset switch connected between said other pressure sensitive switch means and said lamp for turning off said lamp after being turned on.

* * * * *